(12) United States Patent
Duckman et al.

(10) Patent No.: US 7,721,033 B2
(45) Date of Patent: May 18, 2010

(54) INTERRUPT NOTIFICATION BLOCK

(75) Inventors: David James Duckman, Costa Mesa, CA (US); Gregory John Scherer, Costa Mesa, CA (US)

(73) Assignee: Emulex Design & Manufacturing Corporation, Costa Mesa, CA (US)

(*) Notice: Subject to any disclaimer, the term of this patent is extended or adjusted under 35 U.S.C. 154(b) by 887 days.

(21) Appl. No.: 11/004,346

(22) Filed: Dec. 3, 2004

(65) Prior Publication Data

US 2006/0123160 A1 Jun. 8, 2006

(51) Int. Cl.
G06F 13/24 (2006.01)
G06F 13/32 (2006.01)

(52) U.S. Cl. ............... 710/260; 710/263; 710/266

(58) Field of Classification Search ......... 710/260–263, 710/266–268
See application file for complete search history.

(56) References Cited

U.S. PATENT DOCUMENTS

| | | | | |
|---|---|---|---|---|
| 4,449,182 A | * | 5/1984 | Rubinson et al. | ............... 710/60 |
| 5,319,753 A | * | 6/1994 | MacKenna et al. | ............ 710/48 |
| 5,479,638 A | | 12/1995 | Assar et al. | |
| 5,606,660 A | | 2/1997 | Estakhri et al. | |
| 5,708,814 A | | 1/1998 | Short et al. | |
| 6,145,051 A | | 11/2000 | Estakhri et al. | |
| 6,233,643 B1 | * | 5/2001 | Andrews et al. | ............ 710/316 |
| 6,262,918 B1 | | 7/2001 | Estakhri et al. | |
| 6,263,397 B1 | | 7/2001 | Wu et al. | |
| 6,374,337 B1 | | 4/2002 | Estakhri | |
| 6,539,447 B1 | | 3/2003 | Sawada | |
| 6,567,307 B1 | | 5/2003 | Estakhri | |
| 6,789,142 B2 | | 9/2004 | Diamant | |
| 6,851,006 B2 | | 2/2005 | McDaniel | |
| 2004/0054822 A1 | | 3/2004 | Biran et al. | |
| 2006/0075172 A1 | * | 4/2006 | Anand et al. | ............... 710/260 |

FOREIGN PATENT DOCUMENTS

| WO | WO 02/061590 A1 | * | 8/2002 |
|---|---|---|---|
| WO | WO-2006/060648 A2 | | 6/2006 |
| WO | WO-2006/060648 A3 | | 6/2006 |

OTHER PUBLICATIONS

Farmer, Jacob. "InfiniBand holds promise for HPC environments", Infostor. Nov. 2004. PennWell Corporation.*
International Search Report mailed Feb. 6, 2007, for PCT Application No. PCT/US05/43607, filed Dec. 2, 2005, four pages.

* cited by examiner

*Primary Examiner*—Thomas J Cleary
(74) *Attorney, Agent, or Firm*—Morrison & Foerster LLP

(57) ABSTRACT

An interrupt notification block stored in host memory is disclosed that contains an image of the interrupt condition contents that may be stored in a host attention register in a host interface port. The interrupt notification block is written by the host interface port and pre-fixed into the port pointer array of a host at the time the host interface port updates the pointers stored in a port pointer array in host memory. The host may then read the interrupt notification block to determine how to process a response or an interrupt rather than having to read the host attention register in the host interface port across the host bus.

27 Claims, 2 Drawing Sheets

FIG. 1 -- Prior Art --

INTERRUPT NOTIFICATION BLOCK

BACKGROUND OF THE INVENTION

1. Field of the Invention

The present invention relates, generally, to the processing of interrupts by a host, and in particular embodiments, to an interrupt notification block that is writeable by a host interface port and readable by the host to reduce the overhead that is involved when the host processes interrupts or has to read information across the host bus.

2. Description of Related Art

A generalized representation of an exemplary conventional computing system is illustrated in FIG. 1. A computer or server identified generally herein as a host 100 is connected to a host bus 102 (e.g. a PCI-X bus). The host 100 typically includes one or more host processors 114, cache 116, and main memory 132. Also attached to the host bus 102 is at least one port (e.g. a host bus adapter (HBA), an I/O controller, or the like), which is configured by its firmware as an interface to the host 100 and referred to generally herein as a host interface port 104. The host 100 and the host interface ports 104 may all reside within the same chassis. The host 100 and the host interface port 104 must frequently communicate over the host bus 102. For example, the host 100 may ask for service from the host interface port 104 via a command, or configure itself to receive asynchronous information, and be notified when the asynchronous information is available or when the commands have been completed. To facilitate these communications, the host 100 includes a command ring 108 and a response ring 110 in main memory 132, which may comprise a circular queue or other data structure that performs a similar function. In general, rings are used to pass information across the host bus 102 from the host 100 to the host interface port 104, or vice versa.

The command ring 108 stores command representations such as command I/O control blocks (IOCBS) 148 that are to be presented to the host interface port 104. A command IOCB 148 contains all of the information needed by the host interface port 104 to carry out a command. When the host 100 writes a command IOCB 148 into the command ring 108, it also increments a put pointer 144 to indicate that a new command IOCB 148 has been placed into the command ring 108. When the host interface port 104 reads a command IOCB 148 from the command ring 108, it increments a get pointer 146 to indicate that a command IOCB 148 has been read from the command ring 108. In general (excluding for the moment the fact that the command ring 108 is a circular ring that wraps around), if the put pointer 144 is equal to the get pointer 146, the command ring 108 is empty. If the put pointer 144 is ahead of the get pointer 146, there are commands 148 in the command ring 108 to be read by the host interface port 104. If the put pointer 144 is one less than the get pointer 146, the command ring 108 is full.

The response ring 110 stores response indicators such as response IOCBs 156 of asynchronous events written by the host interface port 104, including notifications of command completions and of unexpected events. Response IOCBs 156 contain all of the information needed by the host 100 to recognize the completed commands or to handle the unexpected events. For example, one such response IOCB 156 may require that the host 100 initiate a new command. When the host interface port 104 writes a response IOCB 156 into the response ring 110, it also increments a put pointer 150 to indicate that a new response IOCB 156 has been placed into the response ring 110. When the host 100 reads a response IOCB 156 from the response ring 110, it increments a get pointer 152 to indicate that a response IOCB 156 has been read from the response ring 110.

The host 100 also includes a collection of pointers such as a port pointer array 106 in main memory 132. The port pointer array 106 contains a list of pointers that can be updated by the host interface port 104. These pointers are entry indexes into the command ring 108, response ring 110, and other rings in the host 100. For example, the port pointer array 106 contains the get pointer 146 for the command ring 108 and the put pointer 150 for the response ring 110. When updated, these pointers indicate to the host 100 that a command IOCB 148 has been read from the command ring 108 by the host interface port 104, or that a response IOCB 156 has been written into the response ring 110 by the host interface port 104.

The host interface port 104 includes a host bus configuration area 126. The host bus configuration area 126 contains information that allows the host 100 to identify the type of host interface port 104 and what its characteristics are, and to assign base addresses to the host interface port 104 so that programs can talk to the host interface port 104.

The host interface port 104 also includes a collection of pointers such as a host pointer array 128. The host pointer array 128 contains a list of pointers that can be updated by the host 100. These pointers are entry indexes into the command ring 108, response ring 110, and other rings in the host 100. For example, the host pointer array 128 contains the put pointer 144 for the command ring 108 and the get pointer 152 for the response ring 110. When updated, these pointers indicate to the host interface port 104 that a command IOCB 148 has been written into the command ring 108 by the host 100, or that a response IOCB 156 has been read from the response ring 110 by the host 100. Note that it is relatively inexpensive, from a computational efficiency and overhead standpoint, for the host 100 to initiate writes over the host bus 102, because once the host 100 puts the data onto the host bus 102 (a "posted write"), no acknowledgement is sent, so the host 100 can proceed with the execution of further instructions without waiting for the write operation to complete.

The host interface port 104 also includes structures such as interface registers 118, which include a host attention register 120, a host control register 122, a host status register 124, and a mailbox register 154. The host control register 122 is configurable by the host 100 and contains interrupt enables that identify those attention conditions for which the host 100 would like to receive an interrupt. The host attention register 120 is a concise bitmap of attention conditions of interest to the host 100. For example, these attention conditions may indicate that there has been an update to the response ring put pointer 150 (which indicates that new responses are available), a link attention condition has occurred, a mailbox operation has completed, or an error condition has occurred.

When the host interface port 104 has completed the processing of a command from the host 100, the host interface port 104 first examines the get pointer 152 for the response ring 110 stored in the host pointer array 128 and compares it to the known put pointer 150 for the response ring 110 in order to determine if there is space available in the response ring 110 to write a response entry 156. If there is space available, the host interface port 104 becomes master of the host bus 102 and performs a direct memory access (DMA) operation to write a response IOCB 156 into the response ring 110, and performs another DMA operation to update the put pointer 150 in the port pointer array 106, indicating that there is a new response IOCB 156 to be processed in the response ring 110. The host interface port 104 then writes the appropriate attention conditions into the host attention register 120, and triggers the generation of an interrupt, if interrupts have been enabled by the host 100 in the host control register 122.

When an interrupt is received by the host 100 from the host interface port 104, the host 100 must execute an interrupt handler and a handler for the particular host interface port that initiated the interrupt. The host 100 then initiates a read of the host attention register 120 in the host interface port 104 to determine how to proceed with the interrupt. It is expensive, from a computational efficiency standpoint, for the host 100 to go out over the host bus 102 and read the host attention register 120 in the host interface port 104, because the host 100 must wait for the operation currently being executed in the host 100 to complete (which may take a long time), other host programs currently being executed must be placed on hold, information from the programs currently being executed must be saved off, the interrupting host interface port must be identified, registers for processing the interrupt must be set up, and the host attention register 120 must be read across the host bus 102 and any other intervening buses to determine the condition being reported so that the host 100 can respond accordingly. While the host attention register 120 is being read, no other processing is occurring in the host 100. In addition, the host 100 may have to arbitrate with other requesters. In multi-processor systems, a processor may also have to acquire a "lock" which enables that processor to handle the interrupt.

As described above, the contents of the host attention register 120 indicate to the host 100 what has been changed (e.g. a new response has been written into the response ring 110), and once notified, the host computer can process the change (e.g. read the response and react accordingly). Once the host 100 has called the appropriate routine to process the interrupt, it can write to the host interface port 104 and clear down those attention conditions in the host attention register 120 that the host 100 is currently handling.

One known method of reducing the number of interrupts that the host 100 must process is called interrupt coalescing. Interrupt coalescing is a request by the host 100 that it not be sent interrupts if it has already performed some processing of responses. If interrupt coalescing is enabled, when the host interface port 104 performs DMA operations to write a response IOCB 156 into the response ring 110 and update the put pointer 150 in the port pointer array 106, it does not automatically write the appropriate attention conditions into the host attention register 120. To do so would automatically trigger the generation of an interrupt, if interrupts are enabled in the host control register 122. Instead, the host 100 is given an opportunity to read the pointers in the port pointer array 106 and read and process the next response IOCB 156 in the response ring 110 when it has an opportunity to do so. After a predetermined amount of time has passed or a predetermined number of response IOCBs 156 have been written into the response ring 110 by the host interface port 104, the host interface port 104 reads the host pointer array 128, and if the pointers in the host pointer array 128 indicate that the host 100 is reading response IOCBs 156 from the response ring 110 and making progress in responding to the attention conditions that would ordinarily give rise to an interrupt, then the host interface port 104 may defer writing attention conditions to the host attention register 120 and initiating an interrupt. If, on the other hand, the predetermined amount of time has passed or the predetermined number of response IOCBs 156 have been written by the host interface port 104 into the response ring 110, but no progress by the host 100 is indicated by the host pointer array 128, the host 100 needs to be awakened. The host interface port 104 writes the appropriate attention condition information into the host attention register 120 and an interrupt is generated. When the host 100 receives the interrupt, it must incur the expense of reading the host attention register 120 of the host interface port 104 that sent the interrupt.

Despite the improvements in overhead that are possible with interrupt coalescing, there is still a need to further reduce the overhead that is involved when the host processes interrupts or has to read information across the host bus.

SUMMARY OF THE INVENTION

The present invention is directed to an interrupt notification block stored in host memory that provides a copy of attention conditions needed by a host to process responses from a host interface port. This attention condition information has been conventionally stored in a host attention register in the host interface port, and it is very expensive for the host to read these attention conditions from the host attention register across the host bus. By providing these attention conditions in host memory, it reduces the overhead that is involved when the host processes interrupts and reduces the number of times that the host has to read information across the host bus in order to process an interrupt or response.

When the host interface port has completed the processing of a command from the host, the host interface port performs a DMA operation to write a response IOCB into a response ring. The host interface port then performs another DMA operation to update a response ring put pointer in a port pointer array (indicating that there is a new response in the response ring to be processed), and at the same time writes the interrupt notification block, which includes a host attention register (HAR) copy and a counter, by retrieving the appropriate attention conditions from firmware running in the host interface port and writing the HAR copy and counter into host memory.

The HAR copy contains an image of attention conditions that may be stored in the host attention register, including everything the host needs to know to process interrupts, such as the particular rings that need attention. The counter assists the host in determining when the HAR copy has been updated and contains new attention conditions. The value of the counter is changed every time the interrupt notification block is written. When the host reads the HAR copy, it also saves the value of the counter. After the host has acted on the information in the HAR copy, the host can again check the value of the counter. If the value is different, the host knows that new information has been stored in the HAR copy, and must be read from the HAR copy and processed.

After the interrupt notification block is written, if interrupt coalescing is not being utilized, then the host interface port writes the attention conditions into the host attention register, and triggers the generation of an interrupt. Upon receiving the interrupt, instead of reading the host attention register from the host interface port, the host reads the interrupt notification block and processes the interrupt accordingly.

If interrupt coalescing is being utilized, then the host interface port does not automatically write the attention conditions into the host attention register. To do so would automatically trigger the generation of an interrupt. Instead, the host is given an opportunity to read the pointers in the port pointer array and/or the interrupt notification block, which indicates to the host what attention conditions (responses) are pending. The host may process some of the responses it has received when it has an opportunity to do so, and update the pointers in the host pointer array to indicate to the host interface port that the host is making progress in processing the responses.

If, on the other hand, no progress by the host is indicated over a predetermined amount of time, or if a predetermined number of response entries has been stored by the host interface port into the response ring without progress by the host, the host needs to be awakened. The host interface port will then update the attention conditions in the host attention register and generate an interrupt. However, instead of performing the expensive read of the host attention register, the host can simply read the interrupt notification block to process the response. When the host has fully processed the response from the host interface port, the host performs a write to the host attention register to clear the appropriate interrupt conditions.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
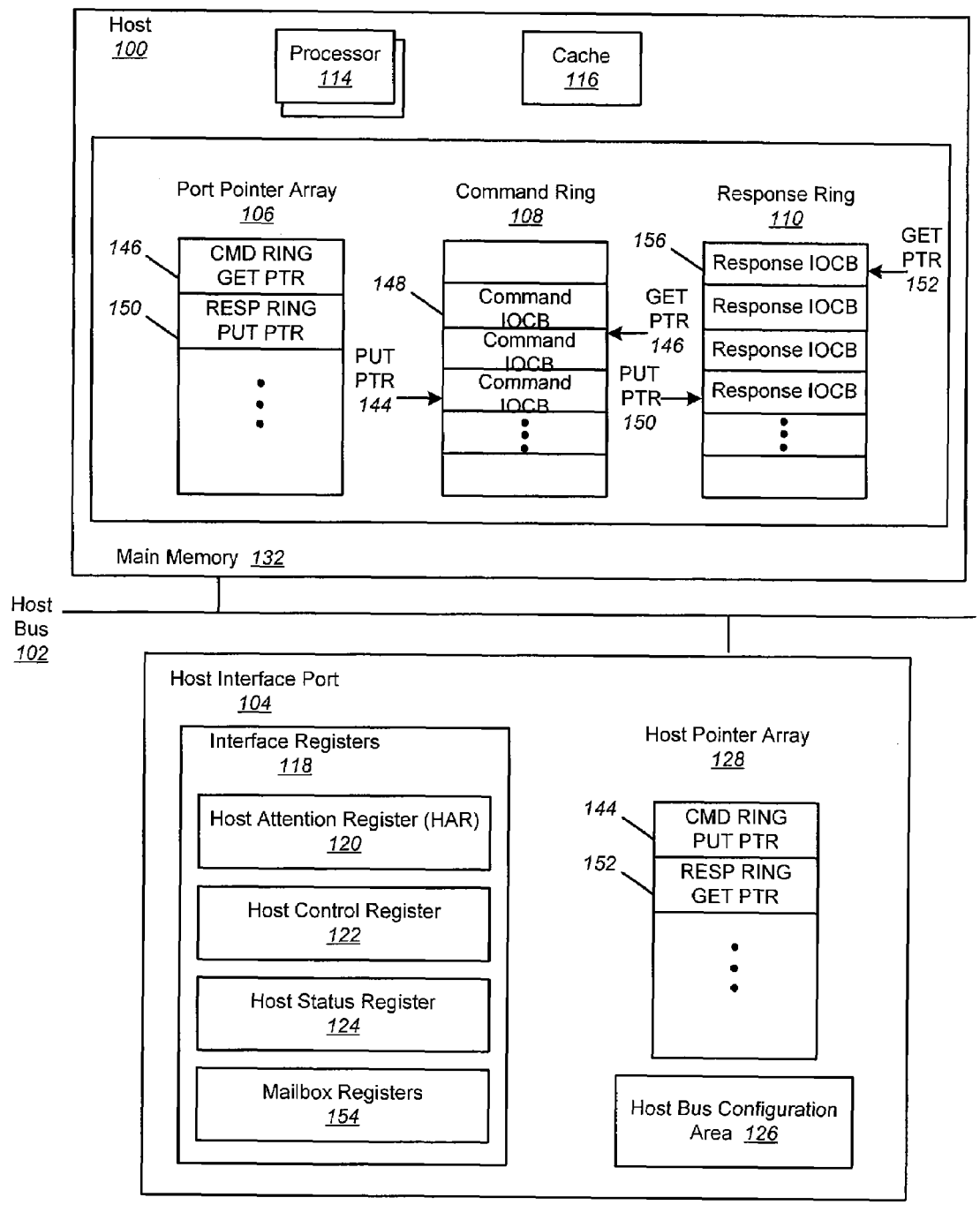
FIG. 1 illustrates a conventional computing system and the registers, arrays and rings required for interrupt processing.
Figure 2:
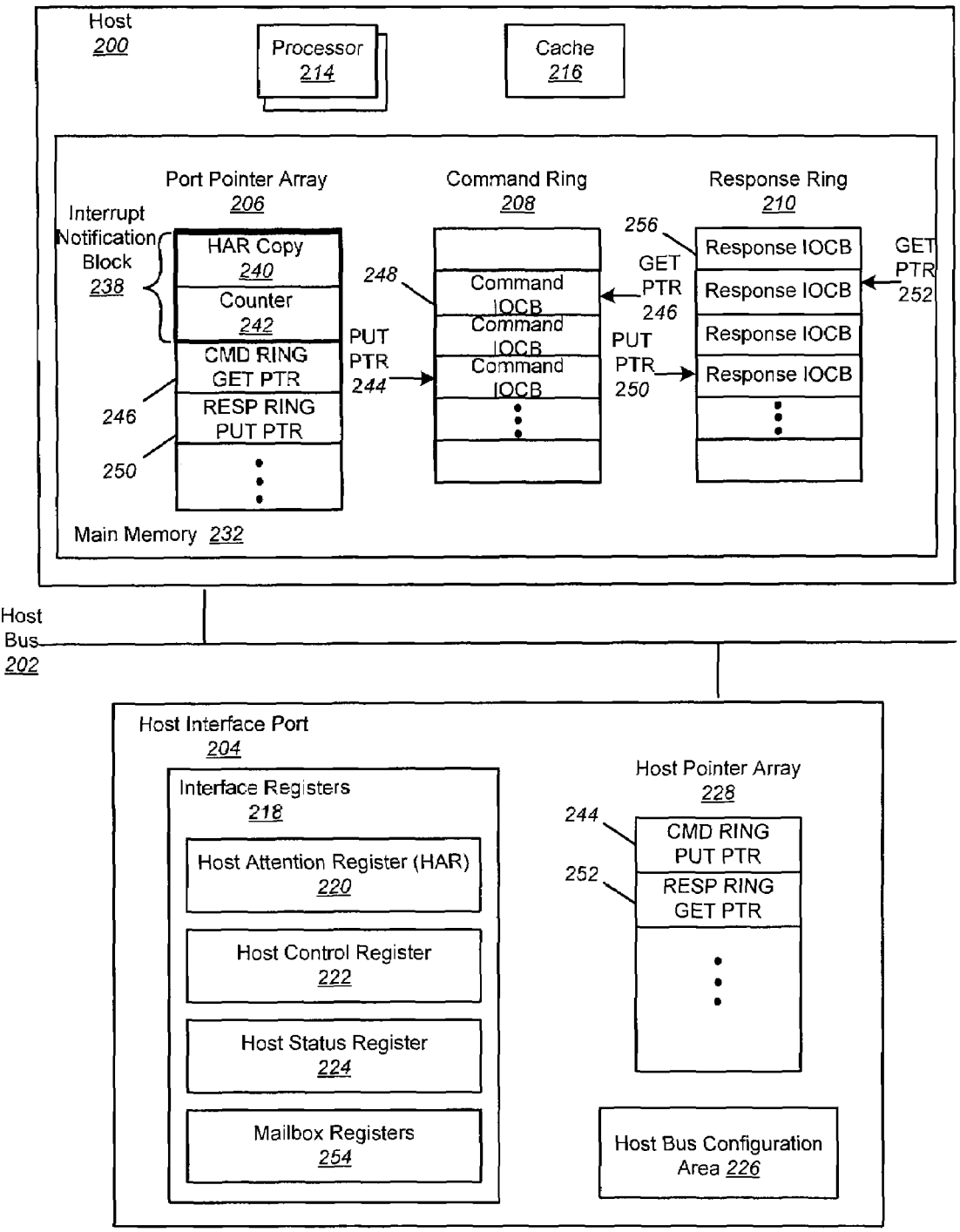
FIG. 2 illustrates a computing system utilizing an interrupt notification block according to embodiments of the present invention.

FIG. 2 illustrates a computing system according to a specific, preferred embodiment of the present invention that is similar to that conventional system of FIG. 1, except that an interrupt notification block 238 is part of the port pointer array 206. The interrupt notification block 238 includes a host attention register (HAR) copy 240 and a counter 242. However, it should be understood that the HAR copy 240 and counter 242 could be replaced with other data structures or circuits that perform the same function as understood by those skilled in the art.

When the host interface port 204 has completed the processing of a command from the host 200, the host interface port 204 first examines the get pointer 252 for the response ring 210 stored in the host pointer array 228 and compares it to the known put pointer 250 for the response ring 210 in order to determine if there is space available in the response ring 210 to write a response IOCB 256. If there is space available, the host interface port 204 becomes master of the host bus 202 and performs a DMA operation to write a response IOCB 256 into the response ring 210. The host interface port 204 then performs another DMA operation to update the put pointer 250 in the port pointer array 206 (indicating that there is a new response in the response ring 210 to be processed), and at the same time writes the interrupt notification block 238 (HAR copy 240 and counter 242) by retrieving the appropriate attention conditions from the firmware running in the host interface port 204 and writing the HAR copy 240 and counter 242 into host memory.

The HAR copy 240 contains an image of the attention conditions that may be stored in the host attention register 220, including everything the host 200 needs to know to process interrupts, such as the particular rings that need attention. Note that the HAR copy 240 contains not only information related to new attention conditions that the host 200 needs to be aware of, but also information related to other attention conditions that have not been handled yet. In other words, it is an accumulation of all of the information related to all of the attention conditions that the host 200 needs to handle. The host 200 can thereafter access the information in the HAR copy 240 without needing to read the host attention register 204 in the host interface port 204.

Note that the host 200 need not receive an interrupt from a host interface port 204 in order to process attention conditions in the HAR copy 240. The host 200 can, at any time when it is available and able to do so, read the HAR copy 240 and process attention conditions. To assist the host 200 in determining when the HAR copy 240 has been updated and contains new attention conditions, the interrupt notification block 238 also includes a counter 242, which is also written by the host interface port 204 to change the value of the counter 242 every time the interrupt notification block 238 is written. When the host 200 reads the HAR copy 240, it also saves the value of the counter 242. After the host 200 has acted on the information in the HAR copy 240, but before getting out of the interrupt handling level, the host 200 can again check the value of the counter 242. If the value is different, the host 200 knows that new information has been stored in the HAR copy 240, and must be read from the HAR copy 240 and processed.

After the interrupt notification block 238 is written, if interrupt coalescing is not being utilized, then the host interface port 204 writes the HAR copy information into the host attention register 220, and triggers the generation of an interrupt, if interrupts are enabled in the host control register 222. Upon receiving the interrupt, instead of reading the host attention register 220 from the host interface port 204, the host 200 reads the interrupt notification block 238 and processes the interrupt accordingly.

If interrupt coalescing is being utilized, then the host interface port 204 does not automatically write the HAR copy information into the host attention register 220. To do so would automatically trigger the generation of an interrupt, if interrupts are enabled in the host control register 222. Instead, the host 200 is given an opportunity to read the pointers in the port pointer array 206 and/or the interrupt notification block 238, which indicates to the host 200 what attention conditions (responses) are pending. The host 200 may process some of the responses it has received when it has an opportunity to do so, and update the pointers in the host pointer array 228 to indicate to the host interface port 204 that the host 200 is making progress in processing the responses. For example, the host interface port 204 can read the get pointer 252 in the host pointer array 228, and if the get pointer 252 indicates that the host computer is reading the responses in the response ring 210 and making progress in responding to the attention conditions that would ordinarily give rise to an interrupt, then the host interface port 204 may not write to the host attention register 220 and initiate an interrupt.

If, on the other hand, no progress by the host 200 is indicated over a predetermined amount of time, or if a predetermined number of response entries has been stored by the host interface port 204 into the response ring 210, the host 200 needs to be awakened. The host interface port 204 will then update the attention conditions in the host attention register 220 and generate an interrupt. However, instead of performing the expensive read of the host attention register 220, the host 200 can simply read the interrupt notification block 238 to process the response.

When the host 200 has fully processed the response from the host interface port 204, the host 200 performs a write to the host attention register 220 to clear the appropriate interrupt conditions.

A software driver executable on the host 200, and firmware executable on the host interface port 204 may be written to implement the embodiments of the present invention described above. However, in alternative embodiments, the features described above may be implemented in software, firmware, or hardware.

If a software driver incorporating the embodiments of the present invention described above is initialized, it will poll the host interface port 204 to determine if the host interface port 204 supports an interrupt notification block 238. If the host interface port 204 includes firmware that incorporates the embodiments of the present invention described above, an affirmative response will be received by the software driver, and more efficient communications between the host 200 and the host interface port 204 will occur utilizing the interrupt notification block 238 as described above. If the host interface port 204 does not include firmware that incorporates the embodiments of the present invention described above, an affirmative response will not be received. In such a case, the interrupt notification block 238 will not be written and, without the benefit of the interrupt notification block 238, communications between the host 200 and the host interface port 204 will occur as described in the Background section above.

If a software driver that does not incorporate the embodiments of the present invention described above is initialized and configured, it will not configure itself to recognize an interrupt notification block 238. If the host interface port 204 also does not include firmware that incorporates the embodiments of the present invention described above, then of course communications between the host 200 and the host interface port 204 will occur as described in the Background section above. Even if the host interface port 204 includes firmware that incorporates the embodiments of the present invention described above, and attempts to write the interrupt notification block 238, it will not be successful. Without the benefit of the interrupt notification block 238, communications between the host 200 and the host interface port 204 will occur as described in the Background section above.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for assisting a host in processing an interrupt associated with an attention condition, which is information needed by the host for processing the interrupt, the method comprising:
   processing a command from said host and upon completion of processing the command, writing a response in a response ring in a host memory;
   retrieving the attention condition in a host interface port coupled to said host over a host bus after writing said response in said host memory;
   performing a single write operation in which a pointer in said host is updated to indicate the interrupt to be received, and the attention condition is written across said host bus into a host memory data structure in said host memory, said host memory data structure storing an image of a plurality of attention conditions corresponding to respective interrupts;
   determining whether interrupt coalescing is being utilized; and
   if no interrupt coalescing is being utilized, automatically triggering the interrupt for the host to process, and reading the attention condition directly from the image stored in the host memory data structure in processing the interrupt in accordance with the attention condition.

2. The method as recited in claim 1, wherein the host memory data structure comprises:
   an interrupt notification block that includes, besides the image of the plurality of attention conditions, a counter value indicating to the host whether new information has been stored in the interrupt notification block and needs to be processed.

3. The method as recited in claim 2, wherein the image of the plurality of attention conditions includes one or more new attention conditions and previous attention conditions that the host has not yet processed, if any.

4. The method as recited in claim 2, further comprising:
   updating the counter value each time the image of the plurality of attention conditions is written into the interrupt notification block.

5. The method as recited in claim 1, further comprising:
   writing the attention condition into a host attention register in the host interface port prior to sending the interrupt to the host.

6. The method as recited in claim 5, further comprising:
   sending the interrupt to the host after writing the attention condition into the host attention register in the host interface port, if interrupts are enabled in a host control register in the host interface port.

7. The method as recited in claim 1, further comprising:
   if interrupt coalescing is being utilized, determining if the host is making progress toward processing the attention condition; and
   if progress is determined, deferring sending the interrupt to the host.

8. The method as recited in claim 7, further comprising:
   if no progress is determined for a predetermined amount of time, sending the interrupt to the host after writing the attention condition into the host attention register in the host interface port, if interrupts are enabled in a host control register in the host interface port.

9. One or more storage media including a computer program which, when executed by one or more processors, causes the one or more processors to perform the steps of:
   processing a command from said host and upon completion of processing the command, writing a response in a response ring in a host memory;
   retrieving the attention condition in a host interface port coupled to said host over a host bus after writing said response in said host memory;
   performing a single write operation in which a pointer in said host is updated to indicate the interrupt to be received, and the attention condition is written across said host bus into a host memory data structure in said host memory, said host memory data structure storing an image of a plurality of attention conditions corresponding to respective interrupts;
   determining whether interrupt coalescing is being utilized; and
   if no interrupt coalescing is being utilized, automatically triggering the interrupt for the host to process, and reading the attention condition directly from the image stored in the host memory data structure in processing the interrupt in accordance with the attention condition.

10. The one or more storage media as recited in claim 9, wherein the host memory data structure comprises:
    an interrupt notification block that includes, besides the image of the plurality of attention conditions, a counter value indicating to the host whether new information has been stored in the interruption block and needs to be processed.

11. The one or more storage media as recited in claim 10, wherein the image of the plurality of attention conditions includes one or more new attention conditions and previous attention conditions that the host has not yet processed, if any.

12. The one or more storage media as recited in claim 10, wherein the computer program, when executed by the one or more processors, causes the one or more processors to perform the further step of updating the counter value each time the image of the plurality of attention conditions is written into the interrupt notification block.

13. The one or more storage media as recited in claim 9, wherein the computer program, when executed by the one or more processors, causes the one or more processors to perform the further step of writing the attention condition into a host attention register in the host interface port prior to sending the interrupt to the host.

14. The one or more storage media as recited in claim 13, wherein the computer program, when executed by the one or more processors, causes the one or more processors to perform the further step of sending the interrupt to the host after writing the attention condition into the host attention register in the host interface port, if interrupts are enabled in a host control register in the host interface port.

15. The one or more storage media as recited in claim 9, wherein the computer program, when executed by the one or more processors, causes the one or more processors to perform the further steps of:
  if interrupt coalescing is being utilized, determining if the host is making progress toward processing the attention condition; and
  if progress is determined, deferring sending the interrupt to the host.

16. The one or more storage media as recited in claim 15, wherein the computer program, when executed by the one or more processors, causes the one or more processors to perform the further step of:
  if no progress is determined for a predetermined amount of time, sending the interrupt to the host after writing the attention condition into the host attention register in the host interface port, if interrupts are enabled in a host control register in the host interface port.

17. In a host interface port, one or more processors for assisting a host in processing an interrupt associated with an attention condition, which is information needed by the host for processing the interrupt, the one or more processors programmed for:
  processing a command from said host and upon completion of processing the command, writing a response in a response ring in a host memory;
  retrieving the attention condition in a host interface port coupled to said host over a host bus after writing said response in said host memory;
  performing a single write operation in which a pointer in said host is updated to indicate the interrupt to be received, and the attention condition is written across said host bus into a host memory data structure in said host memory, said host memory data structure storing an image of a plurality of attention conditions corresponding to respective interrupts;
  determining whether interrupt coalescing is being utilized; and
  if no interrupt coalescing is being utilized, automatically triggering the interrupt for the host to process, and reading the attention condition directly from the image stored in the host memory data structure in processing the interrupt in accordance with the attention condition n.

18. The one or more programmed processors as recited in claim 17, wherein the host memory data structure comprises an interrupt notification block that includes, besides the image of the plurality of attention conditions, a counter value indicating to the host whether new information has been stored in the interrupt notification block and needs to be processed.

19. The one or more programmed processors as recited in claim 18, wherein the image of the plurality of attention conditions includes one or more new attention conditions and previous attention conditions that the host has not yet processed, if any.

20. The one or more programmed processors as recited in claim 18, wherein the one or more processors are further programmed for updating the counter value into the interrupt notification block each time the image of the plurality of attention conditions is written into the interrupt notification block.

21. The one or more programmed processors as recited in claim 17, wherein the one or more processors are further programmed for writing the attention condition into a host attention register in the host interface port prior to sending the interrupt to the host.

22. The one or more programmed processors as recited in claim 21, wherein the one or more processors are further programmed for sending the interrupt to the host after writing the attention condition into the host attention register in the host interface port, if interrupts are enabled in a host control register in the host interface port.

23. The one or more programmed processors as recited in claim 17, wherein the one or more processors are further programmed for:
  if interrupt coalescing is being utilized, determining if the host is making progress toward processing the attention condition; and
  if progress is determined, deferring sending the interrupt to the host.

24. The one or more programmed processors as recited in claim 23, wherein the one or more processors are further programmed for:
  if no progress is determined for a predetermined amount of time, sending the interrupt to the host after writing the attention condition into the host attention register in the host interface port, if interrupts are enabled in a host control register in the host interface port.

25. The one or more programmed processors as recited in claim 17, wherein the host interface port comprises a host bus adapter (HBA).

26. A server computer comprising the HBA of claim 25.

27. A storage area network (SAN) comprising the server computer of claim 26.

* * * * *